United States Patent
Sheu et al.

(10) Patent No.: US 7,419,627 B2
(45) Date of Patent: *Sep. 2, 2008

(54) CO-CURED VACUUM-ASSISTED RESIN TRANSFER MOLDING MANUFACTURING METHOD

(75) Inventors: Chi Hsien Sheu, Los Angeles, CA (US); Denise M. Shimazu, Los Angeles, CA (US); David Michael Kane, Torrance, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1085 days.

This patent is subject to a terminal disclaimer.

(21) Appl. No.: 10/243,796

(22) Filed: Sep. 13, 2002

(65) Prior Publication Data

US 2004/0051214 A1    Mar. 18, 2004

(51) Int. Cl.
*B29C 70/30* (2006.01)
*B29C 70/06* (2006.01)
*B29C 35/02* (2006.01)
*B29C 33/42* (2006.01)

(52) U.S. Cl. .............. 264/257; 264/258; 264/511; 264/102; 425/544

(58) Field of Classification Search ......... 264/510–512, 264/257–258, 324, 102
See application file for complete search history.

(56) References Cited

U.S. PATENT DOCUMENTS

| | | | |
|---|---|---|---|
| 4,062,917 A * | 12/1977 | Hill et al. ............ | 264/102 |
| 4,492,607 A * | 1/1985 | Halcomb ............. | 156/242 |
| 4,644,039 A | 2/1987 | Boyd et al. | |
| 4,654,407 A | 3/1987 | Domeier | |
| 4,758,395 A * | 7/1988 | Zion ................. | 264/135 |
| 4,927,907 A | 5/1990 | Corley | |
| 4,942,013 A * | 7/1990 | Palmer et al. ........ | 264/511 |

(Continued)

FOREIGN PATENT DOCUMENTS

EP    0 722 826 A2    7/1996

(Continued)

OTHER PUBLICATIONS

Brian Butler, "SAE slide Presentation," Attachment "B," 1 page, Sep. 2001.

(Continued)

*Primary Examiner*—Christina Johnson
*Assistant Examiner*—Matthew J. Daniels
(74) *Attorney, Agent, or Firm*—Fulbright & Jaworski LLP (57) ABSTRACT

According to one embodiment of the invention, a co-cured vacuum-assisted resin transfer molding manufacturing method includes providing a tool base, disposing a prepreg skin panel outwardly from the tool base, disposing one or more tooling details outwardly from the prepreg skin panel, and disposing one or more preforms proximate the one or more tooling details. The one or more preforms are either dry or binderized. The method further includes disposing a high permeability medium between the one or more tooling details and the one or more preforms, enclosing the prepreg skin panel, the one or more tooling details, the one or more preforms, and the high permeability medium with at least one vacuum bag, pulling a vacuum on the vacuum bag, infusing the one or more preforms with a resin, and curing the one or more preforms and the prepreg skin panel.

35 Claims, 5 Drawing Sheets

U.S. PATENT DOCUMENTS

| | | | |
|---|---|---|---|
| 4,973,636 A | 11/1990 | Corley | |
| 5,032,451 A | 7/1991 | Corley | |
| 5,198,515 A | 3/1993 | van Swieten et al. | |
| 5,232,650 A * | 8/1993 | Behan et al. | 264/219 |
| 5,588,392 A * | 12/1996 | Bailey | 114/357 |
| 5,863,635 A * | 1/1999 | Childress | 428/119 |
| 5,876,540 A | 3/1999 | Pannell | |
| 5,876,832 A | 3/1999 | Pannell | |
| 5,906,782 A * | 5/1999 | Blanchard et al. | 264/255 |
| 5,935,475 A | 8/1999 | Scoles et al. | |
| 5,935,698 A | 8/1999 | Pannell | |
| 5,968,445 A * | 10/1999 | McCarville et al. | 264/571 |
| 5,968,639 A | 10/1999 | Childress | |
| 5,980,665 A | 11/1999 | Childress | |
| 6,136,236 A * | 10/2000 | Boccard et al. | 264/40.1 |
| 6,508,909 B1 * | 1/2003 | Cerezo Pancorbo et al. | 156/306.6 |
| 6,638,466 B1 * | 10/2003 | Abbott | 264/238 |
| 2002/0022422 A1 | 2/2002 | Waldrop et al. | 442/179 |
| 2003/0051434 A1 * | 3/2003 | McKague et al. | 52/782.1 |

FOREIGN PATENT DOCUMENTS

WO       WO 03/045671 A1     6/2003

OTHER PUBLICATIONS

Brian Butler, "Composites Affordability Initiative (CAI)," Attachment "C," AIAA slide presentation, 1 page, Apr. 3, 2000.

Brian Butler, "Composites Affordability Initiative," Attachment "D," AIAA presentation, AIAA-2000-1379, 5 pages, Apr. 3, 2000.

B. Butler, et al., "The Composites Affordability Initiative, Phase II, Pervasive Technology Overview," Attachment "E," Sample paper, 7 pages, May 2000.

D. Shimazu, et al., "Wing Producibility Demonstration Article Composites Affordability Initiative," Presented at Sampe May 2000, 11 pages, Copyright 2000.

U.S. Appl. No. 10/153,301, filed May 22, 2002 entitled "Co-Cured Resin Transfer Molding Manufacturing Method" to inventors, Shimazu, Husmann and Sheu, pending.

European Patent Office Search Report for EP 03 25 5455, 3 pages, Jan. 20, 2004.

* cited by examiner

CO-CURED VACUUM-ASSISTED RESIN TRANSFER MOLDING MANUFACTURING METHOD

GOVERNMENT RIGHTS

This invention was made with Government support under Contract No F33615-98-3-5106 awarded by the Air Force. The government has certain rights in this invention.

TECHNICAL FIELD OF THE INVENTION

The present invention relates generally to the field of composites construction and, more particularly, to a co-cured resin vacuum-assisted transfer molding manufacturing method.

BACKGROUND OF THE INVENTION

Composite structures are desirable in many industries for many applications. For example, aircraft, space, and land/sea vehicles employ a variety of curved and multiple-contoured surface structures in their fabrication. Composite materials are commonly used for these structures because, among other desirable attributes, composite materials have high strength-to-weight ratios and allow the design and fabrication of large integrated composite structures. Even so, structures formed from composite materials oftentimes need to be stiffened or joined to adjacent structures. Therefore, manufacturers of composite structures are continually searching for better and more economical ways of stiffening and/or assembling composite structures.

SUMMARY OF THE INVENTION

According to one embodiment of the invention, a co-cured vacuum-assisted resin transfer molding manufacturing method includes providing a tool base, disposing a prepreg skin panel outwardly from the tool base, disposing one or more tooling details outwardly from the prepreg skin panel, and disposing one or more preforms proximate the one or more tooling details. The one or more preforms are either dry or binderized. The method further includes disposing a high permeability medium between the one or more tooling details and the one or more preforms, enclosing the prepreg skin panel, the one or more tooling details, the one or more preforms, and the high permeability medium with at least one vacuum bag, pulling a vacuum on the vacuum bag, infusing the one or more preforms with a resin, and curing the one or more preforms and the prepreg skin panel.

Embodiments of the invention provide a number of technical advantages. Embodiments of the invention may include all, some, or none of these advantages. A composite structure manufactured according to one embodiment of the present invention is cost-efficient because of the substantial reduction or elimination of touch labor allowed by part count and fastener count reduction due to part integration. In addition, superior dimensional control and less weight of stiffened composite structures is achieved. This weight reduction is particularly advantageous in aircraft applications. A manufacturer of composite structures may tailor a skin panel for weight efficiency and high performance via unidirectional prepreg product forms, for example. Also, three-dimensional preform substructure joints improve joint producibility and structural performance. In addition, large scale integrated structures may be fabricated out-of-autoclave, which saves time and cost.

In some embodiments, no mechanical fasteners or adhesives are needed to attach a substructure to a skin panel, which saves considerable time and money in constructing stiffened composite structures. However, Z-pins or film adhesives may be used to complement the co-curing of the substructure to the skin panel to improve crack propagation resistance.

Other technical advantages are readily apparent to one skilled in the art from the following figures, descriptions, and claims.

BRIEF DESCRIPTION OF THE DRAWINGS

For a more complete understanding of the invention, and for further features and advantages, reference is now made to the following description, taken in conjunction with the accompanying drawings, in which.

DETAILED DESCRIPTION OF EXAMPLE EMBODIMENTS OF THE INVENTION

Example embodiments of the present invention and their advantages are best understood by referring now to FIGS. 1 through 3D of the drawings, in which like numerals refer to like parts.

Figure 1:
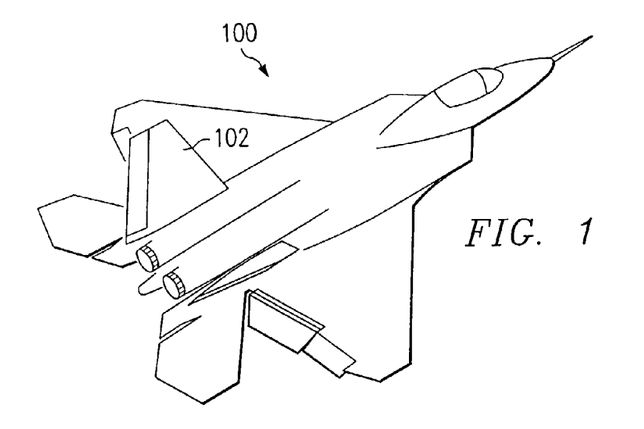
FIG. 1 is a perspective view of an aircraft having a panel formed from a composite structure constructed according to one embodiment of the present invention.

FIG. 1 is a perspective view of an aircraft 100 having a panel 102 formed from a composite structure 200 (FIG. 2) constructed according to one embodiment of the present invention. Aircraft 100 may be any suitable aircraft and panel 102 may be any suitable structural panel on aircraft 100, such as a tail panel, a wing panel, or a fuselage panel. Although aircraft 100 is illustrated in FIG. 1, panel 102 may be employed in any suitable aircraft, space, land/sea vehicle, or other machines, devices, or structures formed by composite materials. The following detailed description uses an aircraft application to illustrate one or more embodiments of composite structure 200 manufactured according to the teachings of the present invention. One embodiment of composite structure 200 is illustrated below in conjunction with FIG. 2.

Figure 2:
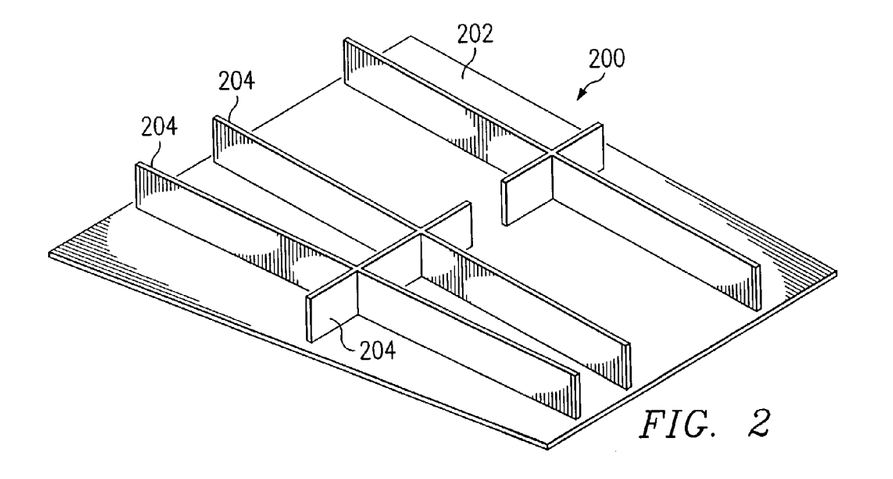
FIG. 2 is a perspective view of the inside of the composite structure of FIG. 1.

FIG. 2 is an inside perspective view of one embodiment of composite structure 200. Composite structure 200 is formed from, in one embodiment, a prepreg skin panel 202 and one or more preforms 204 that are cocured to prepreg skin panel 202 according to the teachings of the present invention as set forth below. Generally, a "prepreg" is a composite material (i.e., fiber that is impregnated with a resin) that is not yet cured, though may be partially staged.

Prepreg skin panel 202 is formed from a composite material having any suitable fibers impregnated with any suitable resin. Accordingly, the fibers in prepreg skin panel 202 may be formed from any suitable 2D and/or 3D material and may be uni-directional, bi-directional, chopped, woven or braided. Any suitable number of layers of fiber may be used to form prepreg skin panel 202. The resin may be any suitable resin, such as epoxy or bismaleimide. Prepreg skin panel 202 may be formed using any suitable composite forming technique, such as hand laid, tape laid, fiber placed, or may be a hybrid skin panel. In the illustrated embodiment, prepreg skin panel 202 forms a portion of an outer skin of aircraft 100. For example, prepreg skin panel 202 may coincide with a portion of the outer skin of a tail section, a wing section, or a fuselage section, as mentioned above. Accordingly, prepreg skin panel 202 may have any suitable shape, dimensions, and thickness. In addition, prepreg skin panel 202 may be substantially flat or may have one or more contours to conform to the shape of a particular portion of aircraft 100 or other suitable vehicle or device.

Preforms 204 function to impart strength and/or stiffness to prepreg skin panel 202 or serve as attachment members. As such, preforms 204 are typically in the form of structural shapes, such as I-beams, T-beams, hat stiffeners, or other suitable structural shapes. As illustrated in FIG. 2, preforms 204 form a number of ribs and spars for panel 102 of aircraft 100. There may be any number of preforms 204 formed on the surface of prepreg skin panel 202, and preforms 204 may be arranged in any suitable configuration depending on the design parameters for composite structure 200. Preforms 204 are either dry or binderized, and may be any suitable textile preform, such as a fabric preform, a stitched preform, a warp knit preform, a 3D preform, a braided preform, or any combination thereof. The fiber material may be the same as, or different from, the fiber used in prepreg skin panel 202. Binderized preforms are preforms with resin applied to the surface(s) to provide tack and handling stability to the preform. Any suitable binder resin may be utilized that is compatible with design requirements and manufacturing process.

According to the teachings of the present invention, preforms 204 are joined to prepreg skin panel 202 via co-curing of prepreg skin panel 202 with resin-infused preforms 204, as described in detail below in conjunction with FIGS. 3A through 3D. This co-curing forms a unitized/integrated structure that blends the strengths of many different product forms and processes into a cost-efficient, performance-driven composite structure 200. For example, some embodiments of the present invention capitalize on the dimensional precision of vacuum-assisted resin transfer molding type tooling and the high tailorability, performance, and weight efficiency of prepreg product forms. An important technical advantage of the present invention is that very large structures, such as skin panels for aircraft 100, may be integrated to very large preforms for stiffening and/or attachment purposes.

FIGS. 3A through 3D are perspective views demonstrating one method of constructing composite structure 200 according to one embodiment of the present invention. The method begins by disposing prepreg skin panel 202 outwardly from a tool base 304 of a tool 300. Tool base 304, which is formed from any suitable material, may have any suitable configuration depending on the configuration of prepreg skin panel 202 and preforms 204.

In some embodiments, before disposing prepreg skin panel 202 outwardly from tool base 304, prepreg skin panel 202 may be vacuum debulked, which may remove some of the air pockets in prepreg skin panel 202. The vacuum debulking of prepreg skin panel 202 may be performed at room temperature. An additional vacuum debulk cycle at an elevated temperature for a predetermined time may optionally be utilized. For example, prepreg skin panel 202 may be vacuum debulked at room temperature during lay-up and, after skin collation, debulked at an elevated temperature to improve compaction, such as 250° F. ±50° F., for 30-120 minutes. Pressure may also optionally be applied to further compact prepreg skin panel 202 during debulking. Staging may optionally be utilized to modify the cure characteristics or flow of the prepreg resin.

Figure 3A:
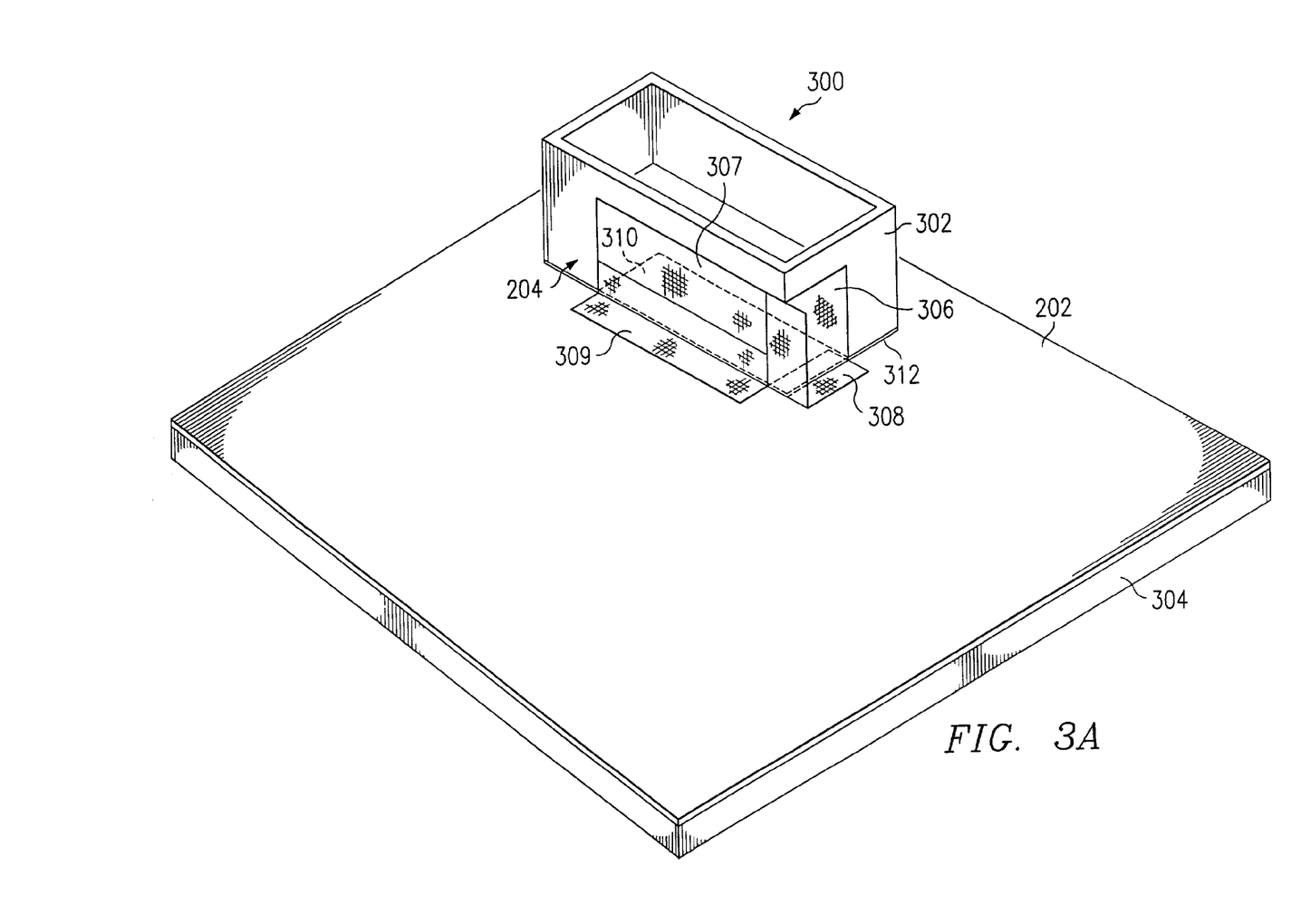
FIGS. 3A through 3D are perspective views illustrating one method of constructing a composite structure according to one embodiment of the present invention.

The next step in the illustrated method is to build up preforms 204 into a predetermined configuration as defined by the design parameters. For example, one predetermined configuration is illustrated by the ribs and spars (denoted by reference numerals 204) in FIG. 2. Accordingly, a first tooling detail 302 is shown in FIG. 3A to be disposed on a portion of prepreg skin panel 202. A tooling detail as described herein refers to a portion or component of an overall tool that is used as a mold for forming composite structure 200. Tooling detail 302 may be formed from any suitable material.

Disposed proximate tooling detail 302 is a preform 204. In this example, preform 204 includes web portions 306 and 307, which are proximate a side of tooling detail 302, and flange portions 308 and 309, portions of which are sandwiched between tooling detail 302 and prepreg skin panel 202. The material, dimensions and configuration of both web portions 306, 307 and flange portions 308, 309 are determined by the design of composite structure 200. In other words, if skin panel 102 of aircraft 100 requires both ribs and spars, as shown in FIG. 2 by reference numerals 204, then web portion 306 and flange portion 308 may be a portion of one of the ribs and web portion 307 and flange portion 309 may be a portion of one of the spars. The remainder of the ribs and spars are built up using other tooling details 302, as described further below.

To facilitate the flow of resin during the infusion of resin into preforms 204, tooling detail 302 may also include a high permeability medium 310, which may be disposed between tooling detail 302 and a portion of web portions 306, 307 and flange portions 308, 309. High permeability medium 310 may be any suitable material, such as a composite screen, that facilitates the flow of resin during a vacuum-assisted resin transfer molding process. High permeability medium 310 is disposed on an outer surface of tooling detail 302 in a position determined by design parameters of the vacuum-assisted resin transfer molding process, such as where the resin is infused and the configuration and details of preforms 204.

Also shown in FIG. 3A is a release fabric 312. In one embodiment, release fabric 312 is disposed between high permeability medium 310 and both web portions 306, 307 and flange portions 308, 309. Release fabric 312 may also continue between tooling detail 302 and prepreg skin panel 202. Release fabric 312 may be any suitable release fabric, such as a Teflon coated release fabric. Release fabric 312 may be of any size larger than high permeability medium 310.

Although not explicitly illustrated in FIG. 3A, a wrap ply may be utilized in some embodiments to facilitate prepreg skin panel 202 design intention. If utilized, the wrap ply is disposed between preform 204 and tooling detail 302. As another option, a resin film (not shown) may be used on the outer surface of the wrap ply and preform 204 to facilitate the placement of wrap ply and preform 204 onto tooling detail 302 and/or the wrap ply. The resin film is typically a tacky material that allows non-tacky materials to stay in place.

Separate tooling details 302 are used to form separate portions of the overall configuration of preforms 204. Each tooling detail 302 is sequentially disposed on base plate 304 with their respective preforms 204 until all tooling details 302 have been placed. In the example illustrated in FIGS. 3A through 3D, a total of eight tooling details 302 are utilized; however, any suitable number of tooling details may be utilized depending on the configuration of composite structure 200.

Figure 3B:
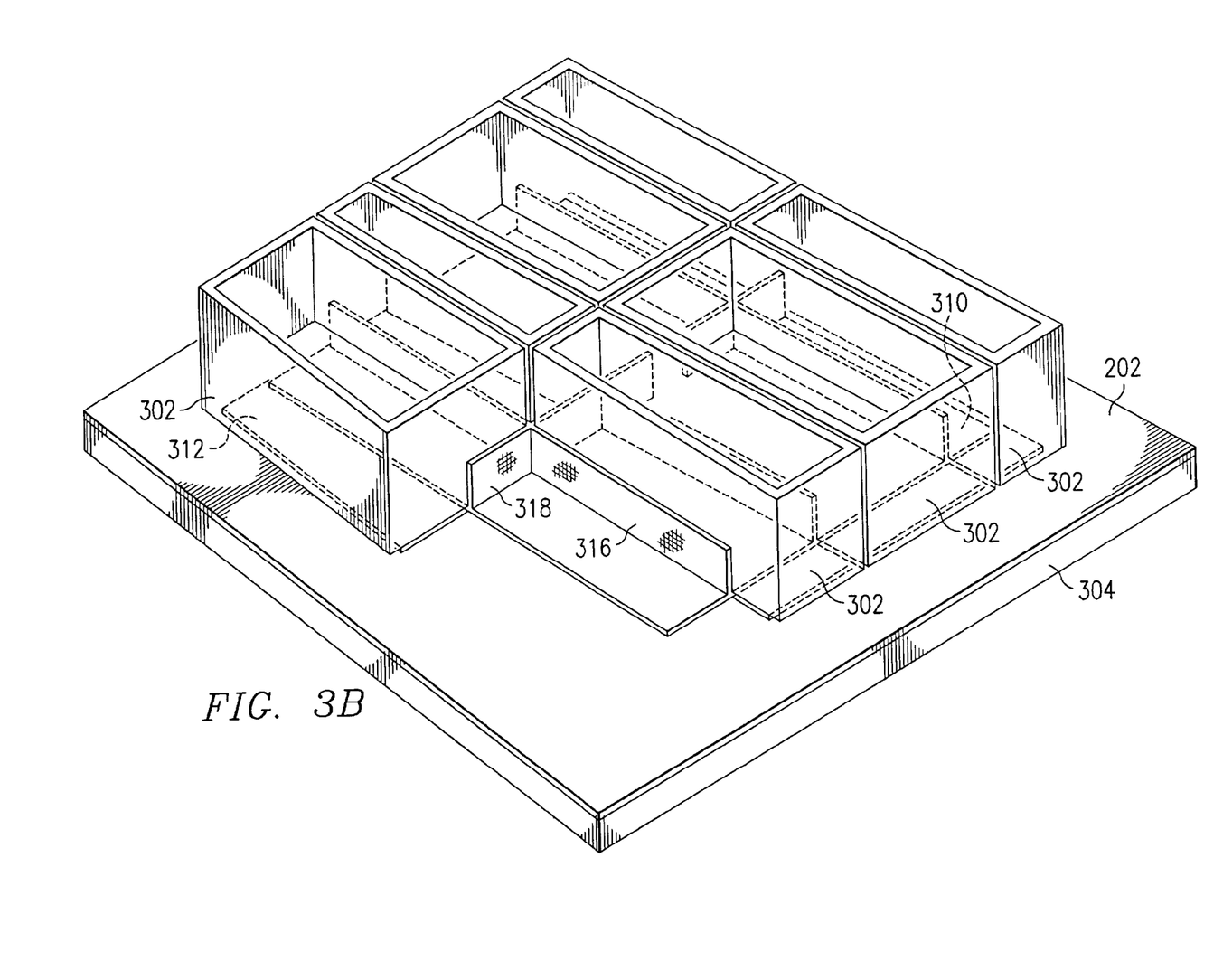

FIG. 3B shows seven of those eight tooling details 302 placed on tool base 304 of tool 300. As illustrated, the general configuration of preforms 204 as outlined in FIG. 2 above may be seen in hidden lines Because the final tooling detail 302 has not been placed on tool base 304 yet, one can see a preform denoted by reference numeral 316 that comprises a portion of a spar web, and a preform as denoted by reference numeral 318 that comprises a portion of a rib web.

Figure 3C:
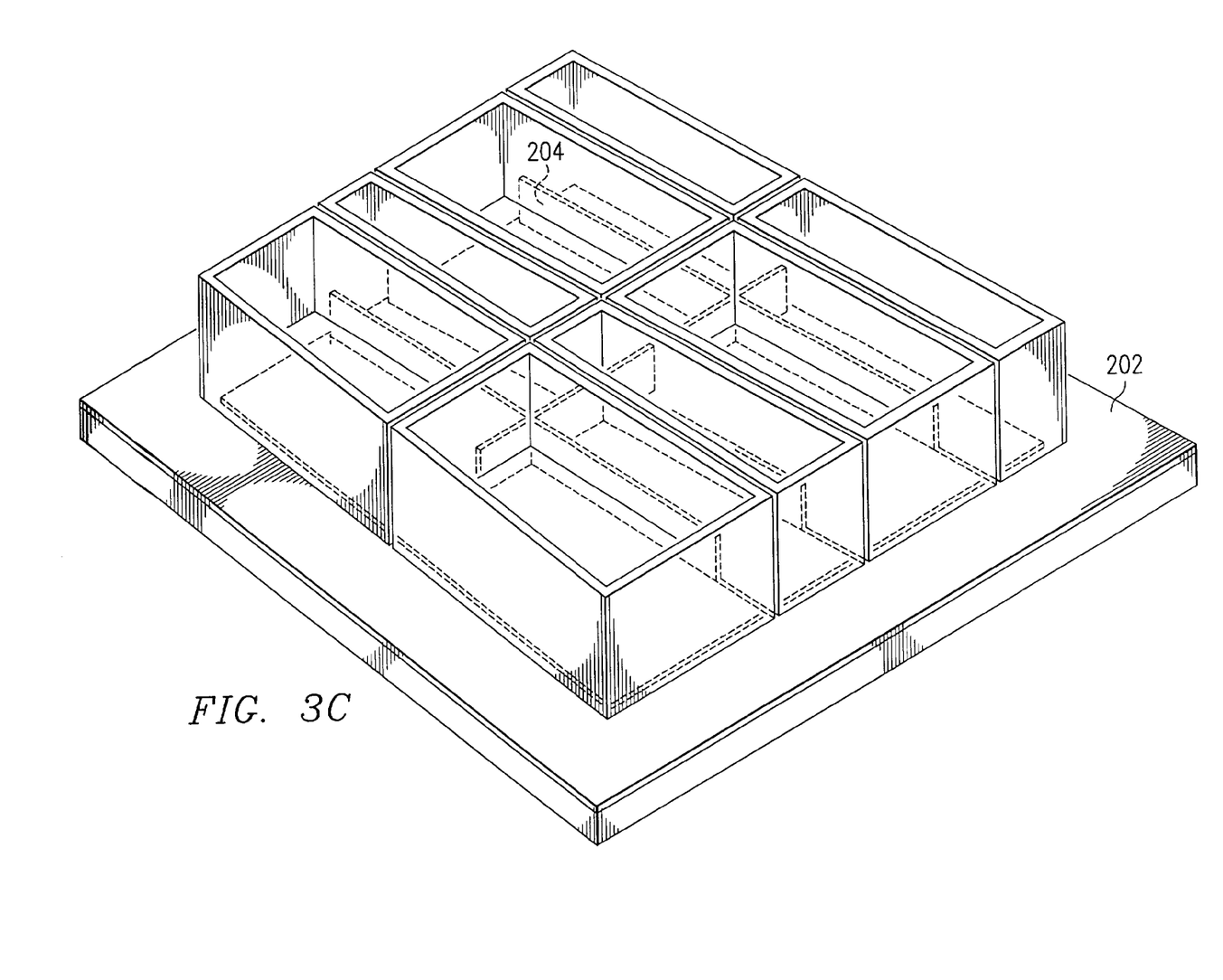

As illustrated in FIG. 3C, prepreg skin panel 202 and preforms 204 are ready to be co-cured via a vacuum-assisted resin transfer molding process, as described below in conjunction with FIG. 3D. Although not explicitly illustrated in FIG. 3C, a plurality of fasteners 322, such as Z-pins, may couple prepreg skin panel 202 to preforms 204 for added strength and/or damage resistance. For example, if a crack starts to develop in composite structure 200 during use, fasteners 322 may inhibit crack propagation. Fasteners 322 may be inserted by any suitable process, such as pushing or driving while being vibrated with ultrasonic energy. Any suitable number of fasteners 322 may be utilized in any suitable configuration. An adhesive film may optionally be disposed between prepreg skin panel 202 and preforms 204. The adhesive film may provide additional bonding between prepreg skin panel 202 and preforms 204. Any suitable adhesive film may be utilized that is compatible with design requirements and manufacturing process.

Figure 3D:
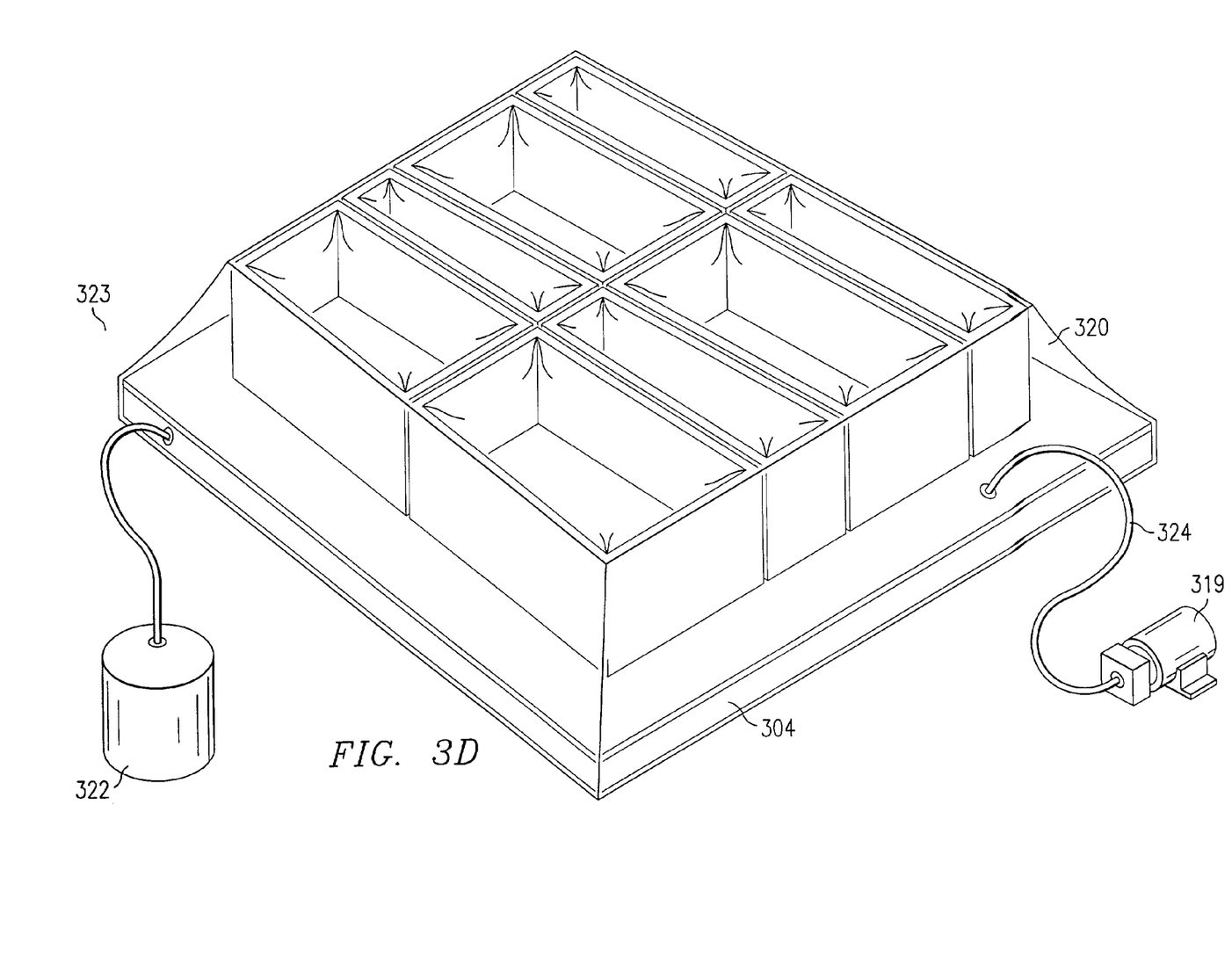

FIG. 3D illustrates one embodiment of a vacuum-assisted resin transfer molding process for the co-curing of prepreg skin panel 202 and preforms 204. Any suitable vacuum bag forming process may be utilized, such as single or double vacuum bag forming. In the illustrated embodiment, a vacuum source 319 is used to pull a vacuum on a vacuum bag 320. After pulling the vacuum, resin contained within a reservoir 322 is allowed to travel through an inlet line 323 into tool base 304 so that the resin may infuse preforms 204 within vacuum bag 320. The infusion is continued until the resin is "witnessed" in a witness line 324.

Embodiments of the infusion and curing cycle is described as follows. Vacuum is applied to vacuum bag 320 and tool base 304 is heated to a predetermined temperature, such as 250° Fahrenheit ±50° F. Other suitable temperatures may be utilized, such as room temperature. The heating of tool base 304 may be accomplished in an oven or tool base 304 may be a self-heated tool. Concurrently, the resin to be infused is heated in reservoir 322 to a predetermined temperature, such as 250° Fahrenheit ±50° F. Again, other suitable temperatures may be utilized, such as room temperature. In a particular embodiment, the resin is heated to a temperature which is less than the temperature of tool base 304. After heating the resin, the resin is vacuum degassed, which prepares the resin for infusion. The resin may also be vacuum degassed at room temperature. After the infusion of the resin (at either an elevated temperature or room temperature), the final curing cycle takes place.

To start the curing cycle, tool base 304 is heated from its injection temperature to a higher temperature, such as 300°-400° Fahrenheit. Tool base 304 is then held for a predetermined time, such as six hours. This holding period helps cure prepreg skin panel 202 and newly resin infused preforms 204 and join them together. As an option, a post cure may be performed for a predetermined time period. For example, a post cure may be carried out at 440° F. for approximately six hours for a bismaleimide resin. This curing may take place while composite structure 200 is in tool base 304 or composite structure 200 may be removed from tool base 304 and placed in any suitable oven. Other suitable temperatures and hold times may be utilized.

Although embodiments of the invention and their advantages are described in detail, a person skilled in the art could make various alterations, additions, and omissions without departing from the spirit and scope of the present invention as defined by the appended claims.

What is claimed is:

1. A co-cured vacuum-assisted resin transfer molding manufacturing method comprising:
    providing a tool base;
    disposing a prepreg skin panel outwardly from the tool base;
    disposing one or more tooling details outwardly from the prepreg skin panel;
    disposing one or more preforms proximate the one or more tooling details, the one or more preforms being either dry or binderized;
    disposing a film adhesive between the prepreg skin panel and the one or more preforms;
    disposing a high permeability medium between the one or more tooling details and the one or more preforms;
    enclosing the prepreg skin panel, the one or more tooling details, the one or more preforms, and the high permeability medium with at least one vacuum bag;
    pulling a vacuum on the vacuum bag;
    infusing the one or more preforms with a resin; and
    curing the one or more preforms and the prepreg skin panel.

2. The method of claim 1, further comprising removing the high permeability medium after curing the one or more preforms and the prepreg skin panel.

3. The method of claim 1, further comprising coupling the prepreg skin panel and the one or more preforms with a plurality of fasteners.

4. The method of claim 3, wherein coupling the prepreg skin panel and the one or more preforms with the fasteners comprises coupling the prepreg skin panel and the one or more preforms with a plurality of Z-pins.

5. The method of claim 1, wherein the one or more preforms are selected from the group consisting of a fabric preform, a stitched preform, a warp knit preform, a 3D preform, and a braided preform.

6. The method of claim 1, further comprising staging the prepreg skin panel.

7. The method of claim 1, wherein the prepreg skin panel is selected from the group consisting of a hand laid prepreg skin panel, a tape laid prepreg skin panel, a fiber placed prepreg skin panel, and a hybrid skin panel.

8. The method of claim 1, further comprising disposing a release fabric between the high permeability medium and both the prepreg skin panel and the one or more preforms.

9. The method of claim 1, wherein infusing the one or more preforms with the resin comprises heating the resin and vacuum degassing the resin before infusing the one or more preforms with the resin.

10. The method of claim 1, wherein infusing the one or more preforms with the resin further comprises heating the tool base and the one or more tooling details to a predetermined temperature before infusing the one or more preforms with the resin.

11. The method of claim 1, wherein the enclosing, pulling, infusing, and curing steps comprise:
    enclosing the prepreg skin panel, the one or more tooling details, the one or more preforms, and the high permeability medium with inner and outer vacuum bags;
    pulling a vacuum on the inner and outer vacuum bags;
    infusing the one or more preforms with a resin; and
    curing the one or more preforms and the prepreg skin panel while maintaining the vacuum on the outer vacuum bag.

12. The method of claim 1, further comprising post-curing the one or more preforms and the prepreg skin panel at an elevated temperature for a predetermined time period.

13. A co-cured vacuum-assisted resin transfer molding manufacturing method, comprising:
- providing a tool base;
- disposing a prepreg skin panel outwardly from the tool base;
- disposing one or more tooling details outwardly from the prepreg skin panel;
- disposing one or more preforms proximate the one or more tooling details, the one or more preforms being either dry or binderized;
- disposing a high permeability medium between the one or more tooling details and the one or more preforms;
- enclosing the prepreg skin panel, the one or more tooling details, the one or more preforms, and the high permeability medium with at least one vacuum bag;
- pulling a vacuum on the vacuum bag;
- vacuum debulking the prepreg skin panel, wherein vacuum debulking the prepreg skin panel comprises vacuum debulking the prepreg skin panel at room temperature for a predetermined time during lay-up and then vacuum debulking the prepreg skin panel at an elevated temperature for a predetermined time after lay-up;
- infusing the one or more preforms with a resin; and
- curing the one or more preforms and the prepreg skin panel.

14. A co-cured vacuum-assisted resin transfer molding manufacturing method, comprising:
- providing a tool base;
- disposing one or more tooling details outwardly from the tool base;
- disposing a high permeability medium outwardly from the one or more tooling details;
- disposing one or more preforms proximate the one or more tooling details, the one or more preforms being either dry or binderized;
- disposing a prepreg skin panel outwardly from the high permeability medium;
- enclosing the one or more tooling details, the high permeability medium, the one or more preforms and the prepreg skin panel with at least one vacuum bag;
- pulling a vacuum on the vacuum bag;
- infusing the one or more preforms with a resin; and
- curing the one or more preforms and the prepreg skin panel,
- wherein the enclosing, pulling, infusing, and curing steps comprise: enclosing the prepreg skin panel, the one or more tooling details, the one or more preforms, and the high permeability medium with inner and outer vacuum bags, pulling a vacuum on the inner and outer vacuum bags, infusing the one or more preforms with a resin, and curing the one or more preforms and the prepreg skin panel while maintaining the vacuum on the outer vacuum bag.

15. The method of claim 14, further comprising removing the high permeability medium after curing the one or more preforms and the prepreg skin panel.

16. The method of claim 14, further comprising disposing a film adhesive between the prepreg skin panel and the one or more preforms.

17. The method of claim 14, further comprising coupling the prepreg skin panel and the one or more preforms with a plurality of fasteners.

18. The method of claim 14, wherein coupling the prepreg skin panel and the one or more preforms with the fasteners comprises coupling the prepreg skin panel and the one or more preforms with a plurality of Z-pins.

19. The method of claim 14, wherein the one or more preforms are selected from the group consisting of a fabric preform, a stitched preform, warp knit preform, a 3D preform, and a braided preform.

20. The method of claim 14, further comprising vacuum debulking the prepreg skin panel.

21. The method of claim 20, wherein vacuum debulking the prepreg skin panel comprises vacuum debulking the prepreg skin panel at room temperature for a predetermined time during lay-up and then vacuum debulking the prepreg skin panel at an elevated temperature for a predetermined time after lay-up.

22. The method of claim 14, further comprising staging the prepreg skin panel.

23. The method of claim 14, wherein the prepreg skin panel is selected from the group consisting of a hand laid prepreg skin panel, a tape laid prepreg skin panel, a fiber placed prepreg skin panel, and a hybrid skin panel.

24. The method of claim 14, further comprising further comprising disposing a release fabric between the high permeability medium and both the prepreg skin panel and the one or more preforms.

25. The method of claim 14, wherein infusing the one or more preforms with the resin comprises heating the resin and vacuum degassing the resin before infusing the one or more preforms with the resin.

26. The method of claim 14, wherein infusing the one or more preforms with the resin further comprises heating the tool base and the one or more tooling details to a predetermined temperature before infusing the one or more preforms with the resin.

27. The method of claim 14, further comprising post-curing the one or more preforms and the prepreg skin panel at an elevated temperature for a predetermined time period.

28. A co-cured vacuum-assisted resin transfer molding manufacturing method, comprising:
- providing a prepreg skin panel;
- processing the prepreg skin panel, the processing selected from the group consisting of vacuum debulking and staging;
- providing a tool base;
- disposing the prepreg skin panel outwardly from the tool base;
- disposing one or more tooling details outwardly from the prepreg skin panel;
- disposing one or more preforms proximate the one or more tooling details, the one or more preforms being either dry or binderized;
- disposing a film adhesive between the prepreg skin panel and the one or more preforms;
- disposing a high permeability medium outwardly from the one or more tooling details;
- disposing a release fabric between the high permeability medium and both the prepreg skin panel and the one or more preforms;
- enclosing the prepreg skin panel, the one or more tooling details, the one or more preforms, and the high permeability medium with at least one vacuum bag;
- pulling a vacuum on the vacuum bag;
- infusing the one or more preforms with a resin; and
- curing the one or more preforms and the prepreg skin panel while maintaining the vacuum on the vacuum bag.

29. The method of claim 28, further comprising coupling the prepreg skin panel and the one or more preforms with a plurality of Z-pins.

30. The method of claim 28, wherein the prepreg skin panel is selected from the group consisting of a hand laid prepreg skin panel, a tape laid prepreg skin panel, a fiber placed prepreg skin panel, and a hybrid skin panel.

31. The method of claim 28, wherein the one or more preforms are selected from the group consisting of a fabric preform, a stitched preform, a warp knit preform a 3D preform, and a braided preform.

32. The method of claim 28, wherein infusing the one or more preforms with the resin comprises heating the resin and vacuum degassing the resin before infusing the one or more preforms with the resin.

33. The method of claim 28, wherein infusing the one or more preforms with the resin further comprises heating the tool base and the one or more tooling details to a predetermined temperature before infusing the one or more preforms with the resin.

34. The method of claim 28, further comprising post-curing the one or more preforms and the prepreg skin panel at an elevated temperature for a predetermined time period.

35. The method of claim 28, wherein the enclosing, pulling, infusing, and curing steps comprise:
  enclosing the prepreg skin panel, the one or more tooling details, the one or more preforms, and the high permeability medium with inner and outer vacuum bags;
  pulling a vacuum on the inner and outer vacuum bags;
  infusing the one or more preforms with a resin; and
  curing the one or more preforms and the prepreg skin panel while maintaining the vacuum on the outer vacuum bag.

* * * * *